United States Patent [19]

Loomer

[11] Patent Number: 5,263,378
[45] Date of Patent: Nov. 23, 1993

[54] INDEXING FEED, HARMONIC DRIVE, QUICK CONNECT/DISCONNECT COUPLING AND MANUFACTURING PROCESS

[75] Inventor: Weston R. Loomer, Walton, Ky.

[73] Assignee: Litton Industrial Automation Systems Inc., Hebron, Ky.

[21] Appl. No.: 870,948

[22] Filed: Apr. 20, 1992

[51] Int. Cl.⁵ .............................................. B65G 25/04
[52] U.S. Cl. ...................................... 74/50; 198/746; 414/750
[58] Field of Search ........................... 57/281, 264, 90; 198/744, 746; 414/750; 74/42, 44, 45, 49, 50

[56] References Cited

U.S. PATENT DOCUMENTS

| | | | |
|---|---|---|---|
| 1,371,340 | 3/1921 | Beam | 74/50 |
| 3,127,056 | 3/1964 | Jackson | 74/50 |
| 3,313,415 | 4/1967 | Swenson et al. | 74/50 |
| 3,508,524 | 4/1970 | Harms | 198/746 X |
| 3,880,073 | 4/1975 | Eberly et al. | 198/746 X |
| 3,931,883 | 1/1976 | Willard et al. | 198/746 X |
| 3,986,605 | 10/1976 | Dooley et al. | 198/746 |
| 4,569,625 | 2/1986 | Dorumsgaard et al. | 414/750 X |

FOREIGN PATENT DOCUMENTS

| | | | |
|---|---|---|---|
| 2938961 | 4/1981 | Fed. Rep. of Germany | 74/50 |
| 61-197314 | 9/1986 | Japan | 198/746 |

*Primary Examiner*—Rodney H. Bonck
*Assistant Examiner*—Ryan W. Massey
*Attorney, Agent, or Firm*—Morris I. Pollack

[57] ABSTRACT

A plurality of work stations are provided each with a plurality of containers, each containing sliver rope, disposed in first and second arrays in proximity to a spinning machine to alternately provide sliver rope to respective spinning positions so that yarn or thread may be spun by each spinning machine. A container support platform supports each array of sliver rope containers in proximity to their respective spinning machine; as well as a container transport assembly which extends the length of the support platform. A number of container moving fingers are pivotally carried in spaced relationship along the length of an elongated, substantially "U" shaped transport beam and for coaction with cams also carried by the transport beam and disposed for coaction with a stationary beam also carried by the container support. A transport beam drive mechanism is coupled by a quick connect/disconnect coupling to the transport beam and applies thereto an increment doubled, modified harmonic drive first to draw the transport beam in a container moving direction wherein the fingers move up to move all sliver containers upon support platform an incremental step; and thereafter to return transport beam back to its starting position. Transport beam drive mechanism is thereafter cycled and recycled to move the containers in incremental steps without lifting the containers off of the support platform. The modified harmonic drive provides extra pull to the transport beam during the portion of the cycle when containers are to be moved and a quick return during the portion of the return portion of the cycle containers to thus optimize cycle time.

20 Claims, 10 Drawing Sheets

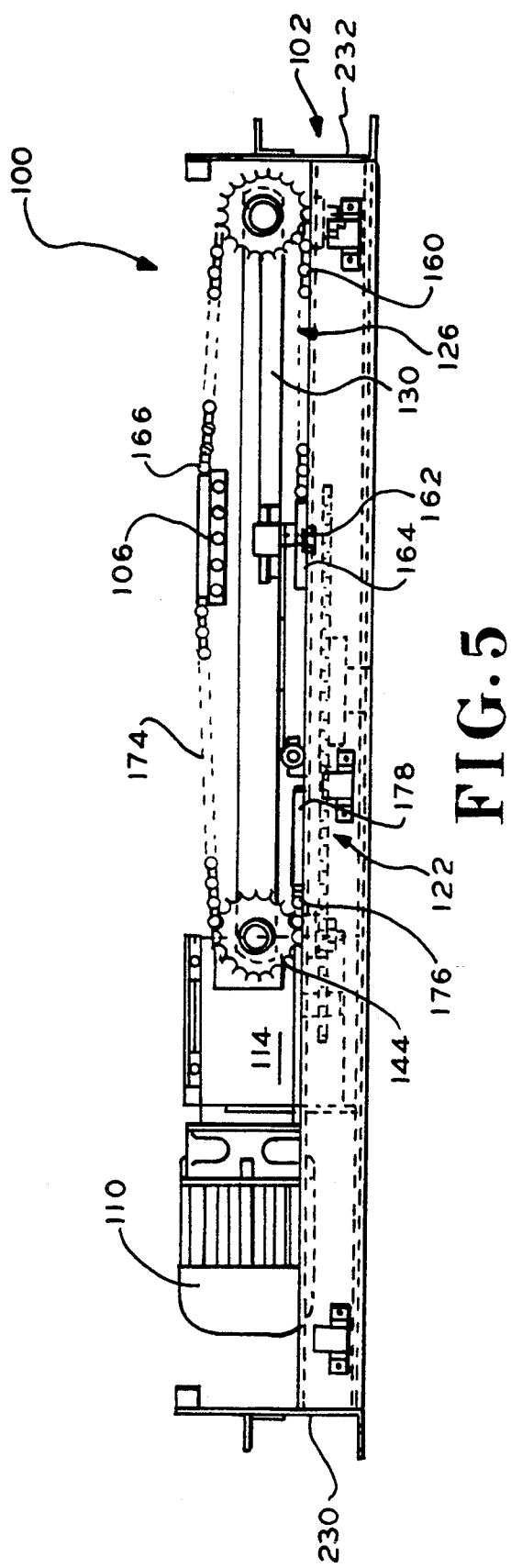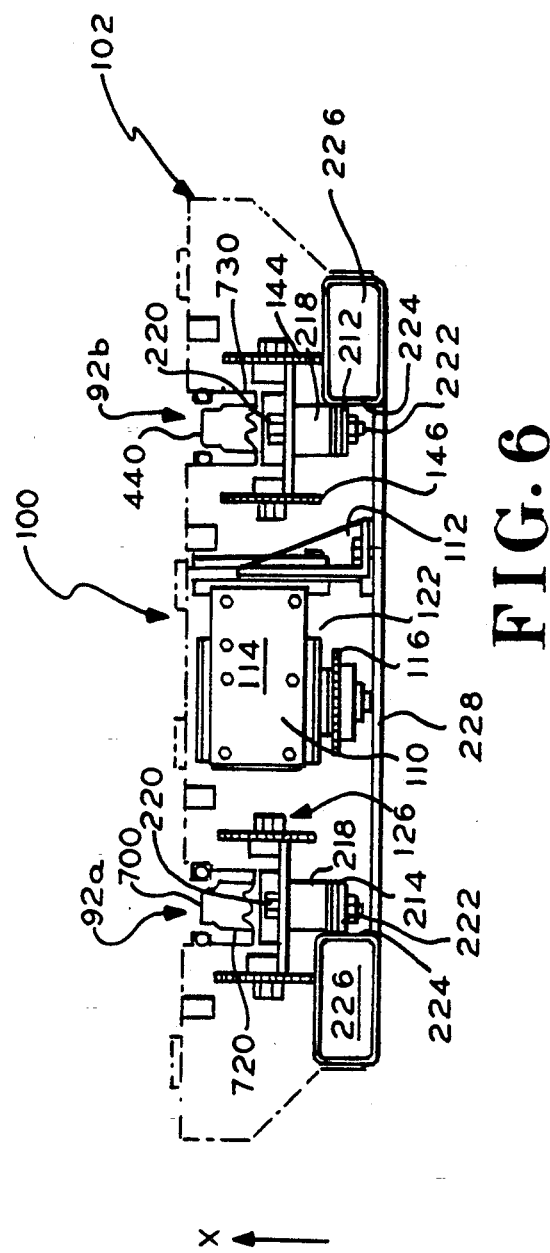

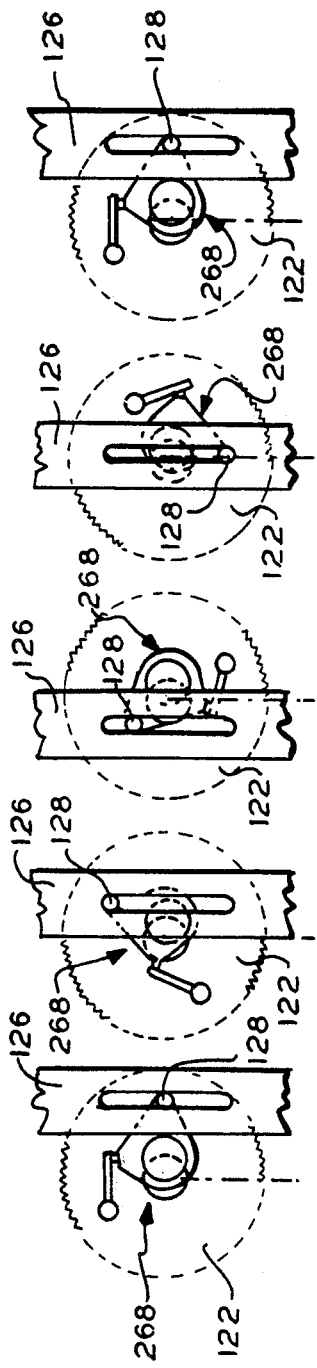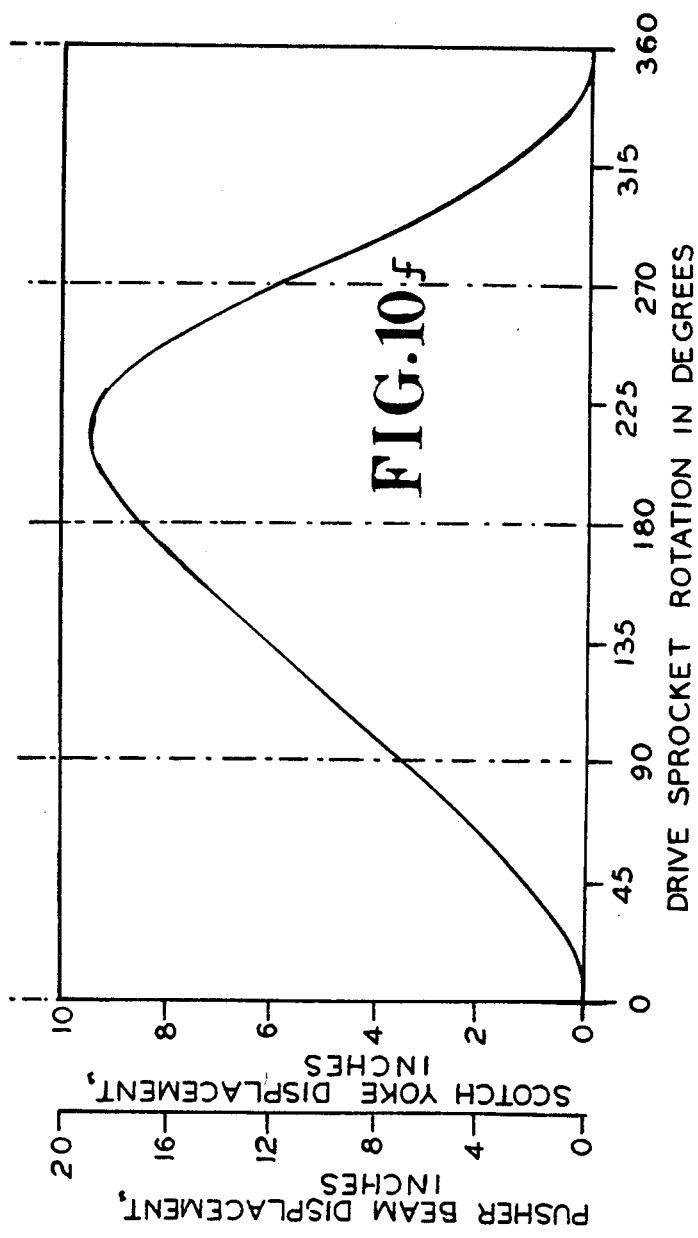

INDEXING FEED, HARMONIC DRIVE, QUICK CONNECT/DISCONNECT COUPLING AND MANUFACTURING PROCESS

BACKGROUND OF THE INVENTION-FIELD OF APPLICATION

This invention relates to: mechanisms for moving articles along prescribed paths; harmonic drives and devices for coupling drives to article moving mechanisms; as well as to manufacturing processes which require the disposition of a plurality of articles at a work station and the removal of said articles upon completion of the work associated with the articles. More particularly this invention relates to: article moving mechanisms which incrementally index articles along a prescribed path; harmonic drives particularly adapted to operate incremental indexing mechanisms; couplings for coupling harmonic drives to indexing mechanisms; and spinning of yarn or thread from sliver.

BACKGROUND OF THE INVENTION—DESCRIPTION OF THE PRIOR ART

Movement of articles along a path from one location to and through another location where work may be performed in respect of the articles and therefrom into yet another location is accomplished today by many different types of article conveyors and for many different purposes. Article conveyors, in turn, quite often require a platform, bed or surface of some kind to support the articles for movement along the path and include a drive for moving articles along that platform, bed or surface as well as a coupling for associating the drive to the article carrying moving structure of the article conveyor.

The performance of work in respect of such articles may involve, for example, package or part storage bins. Such bins would comprise the articles to be moved from a first location (such as a storage facility) into and through a second location (such as a station where packages or parts, etc are removed from or placed into the bins) and on to a third location (where the bins are stored after the work or picking things from the bins or placing things in the bins has been accomplished). Alternatively the articles might be parts in the process of being manufactured and the work could involve one or more manufacturing functions.

Movement of articles into, through and out from the work station dictates a concern for the safety of people who might be working or otherwise located near and about the work station and the path the articles must follow to and from the work station. Many article conveying systems inherently present places where people and articles may collide and injury could result; especially if the articles are being moved at relatively fast speeds or by automated conveyors which are blind to the presence of people. Article conveyors themselves inherently include moving parts which are quite often exposed to ambient conditions in the manufacturing facility; especially at the work station, where there might be sprays, mists, chips, flakes, particles of material and other air carried pollutants. Such pollutants can be, in and of themselves, damaging to exposed conveyor parts and components; especially if the parts and components are lubricated.

Some conveyors include belts upon which the articles are positioned to be transported along the conveyor path. Other conveyors include powered rollers or slats that support the article and move the article from one place to another. Still other article conveyors involved the use of totes, carriers, guided vehicles, cranes, forklifts and the like that are transported along ground-based or overhead rails or guide paths. There are numerous types and configurations of article conveyors and just as numerous types of drives and couplings for use with such conveyors. The type and configuration of the article conveyors and its drive will, in general, depend upon the articles to be conveyed and the work to be accomplished in respect of the conveyed articles. Continuous conveyor platforms such as belts, discontinuous conveyor platforms such as rollers or slats and overhead and land based article carriers can and do create people safety problems; especially where articles are to be moved to and through work stations while operators are present and involved in the manufacturing processes. The supports for these types of conveyors may also present obstructions to the free movement of people in and about work stations while vehicles, cranes, fork lifts and similar article transport carriers can present traffic problems.

Other available conveyors utilize flights, or similar article pushers, which are carried by the conveying medium (i.e. belts, chain, etc) and/or platform and push the article being transported to, through and from the work station. The exposed parts and components of these types of conveyors, in a manufacturing environment, will tend to collect pollutants that fall from the article or might otherwise be carried by the ambient air and as such become fouled; especially if the surface of such parts or components, or portions thereof are lubricated. Such fouling will affect the speed and efficiency of the article transport system and when sufficient fouling has occurred may fully arrest its operation. Cleaning of the pollutants, to minimize the problem they create, in and of itself is difficult for conveyors of this construction and creates its own additional problems.

Some manufacturing processes and/or article transport systems utilize incremental, step by step, indexing of the article to, through and from a particular location and accomplish that type of article movement by a "walking beam" mechanism of the type shown and described in U.S. Pat. No. 4,712,964 granted on Dec. 15, 1987 to G. J. Van Elten et al for *Storage System For Products Using Supporting Units.* Such incremental article transports must lift all the articles on the transport beam up off of an article support platform advance all such lifted articles an incremental step and then set all the articles being so transported down each an incremental step forward; and then repeat the operation time and again until the articles are moved to, through and from the particular location. The forces required to so lift advance and set down all conveyed articles, the drive mechanism to generate such forces and the device to couple the drive to the transport beam in devices such as shown in said U.S. Pat. No. 4,712,964 render the efficiency, cost, and relative complexity in operation of such article conveyors undesirable for many article transport applications. Furthermore it is difficult if not impossible to assure accurate placement of articles being so transported.

In general the conversion of sliver into thread or yarn is accomplished by a spinning machine which generates many spools of thread or yarn at the same time and in a continuous manner. The thread or yarn for each such spool is spun from discontinuous filaments of cotton, wool or the like that have been placed into a continuous loosely arranged rope like arrangement from prior manufacturing processes and are generally referred to as "slivers". Containers, generally in the form of open top cylindrical drums or cans of sliver are usually arrayed in proximity to the spinning machine and the sliver is fed from the container to the spinning machine which, as its spins the yarn or thread, draws the sliver from the container or can. To facilitate a continuous process back-up cans of sliver are also disposed in proximity to the spinning machine and as one can of sliver empties the end of the sliver rope in the back-up can is attached and the process continues. Needless to say each spinning machine thus draws a relatively large number of slivers from a comparable number of cans at the same time and must have a similar number of back-up cans of sliver nearby and available for use as previous cans are emptied. Empty sliver cans must be removed from the machine area and full sliver cans moved into back-up position. The can removal and replacement activity in proximity to the active spinning machine is thus considerable with all the transport movement and transport devices involved often taking place while other people are busy operating the spinning machine including insuring that broken sliver and threads being spun are tied together to provide for continuous processing. Quite often the article (sliver can) removal and replacement is accomplished by fork-lift type vehicles and by people's physical efforts. It may, in some instances, be accomplished by floor level belt and/or roller conveyor which present hazardous and moving obstructions to people who must work at the station or nearby. In addition the sliver elements tend to float into the ambient air and then settle onto the conveyor and other machinery presenting problems in the operation and cleaning of same.

SUMMARY OF THE INVENTION

It is therefore an object of this invention to provide a new and novel manufacturing process.

It is another object of this invention to provide a new and novel process for spinning yarn or thread from sliver provided to the spinning process from cans of sliver disposed in proximity to a spinning machine.

It is yet another object of this invention to provide a new and novel process for spinning yarn or thread wherein automated conveying of sliver containers to, through and from the proximity of the spinning machine facilities and enhances the process.

It is yet another object of this invention to provide a new and novel article conveying mechanism for indexing articles to, through and from a particular location.

It is still another object of this invention to provide a new and novel mechanism for indexing articles in incremental step by step increments while providing an article support platform that is relatively free of moving conveyor elements and thus affords greater personnel safety.

It is yet still another object of this invention to provide a new and novel mechanism for indexing articles in incremental step by step movements while providing for relatively easy cleaning of the article transport devices.

It is a further object of this invention to provide a new and novel article conveyor drive mechanism.

It is yet a further object of this invention to provide a new and novel drive mechanism for an article conveyor which exerts a relatively higher force during a selected portion of its cycle of operation to facilitate article conveyance and a relatively faster speed during another portion of its cycle of operation to minimize the duration of the operating cycle.

It is still a further object of this invention to provide a new and novel drive mechanism for operating an article indexing type conveyor with maximization of the forces during its article feed stroke, minimization of indexing cycle time and effective shortening of the linear stroke distance for the drive mechanism for a particular desired linear article feed increment.

It is yet still a further object of this invention to provide a new and novel device for coupling an article conveyor drive to an article conveyor.

It is yet still another object of this invention to provide a new and novel device for coupling an article conveyor drive to an article conveyor which provides for relatively quick connection and disconnection of the conveyor drive and the article conveyor.

Other objects, features and advantages of the inventions in their details of construction and arrangement of parts will be seen from the above, from the following description of the preferred embodiments when considered with the drawing and from the appended claims.

BRIEF DESCRIPTION OF THE DRAWING

In the drawing:

FIG. 5 is a side elevation view of the article transport drive mechanism taken along line 5—5 of FIG. 4;

FIG. 6 is an end elevation view of the article transport drive mechanism taken along line 6—6 of FIG. 4 and with some covers therefore shown in phantom;

FIG. 10 and 10f are a timing diagram showing the relationship between the rotation of the drive sprocket and the displacement of the scotch yoke and pusher beam of the instant invention;

FIGS. 10a, 10b, 10c, 10d and 10e are schematics of the drive sprocket and drag link mechanism of FIGS. 7—9 showing the relative position of the various parts at different and distinct instances in the drive cycle;

DESCRIPTION OF THE PREFERRED EMBODIMENT

Figure 1:
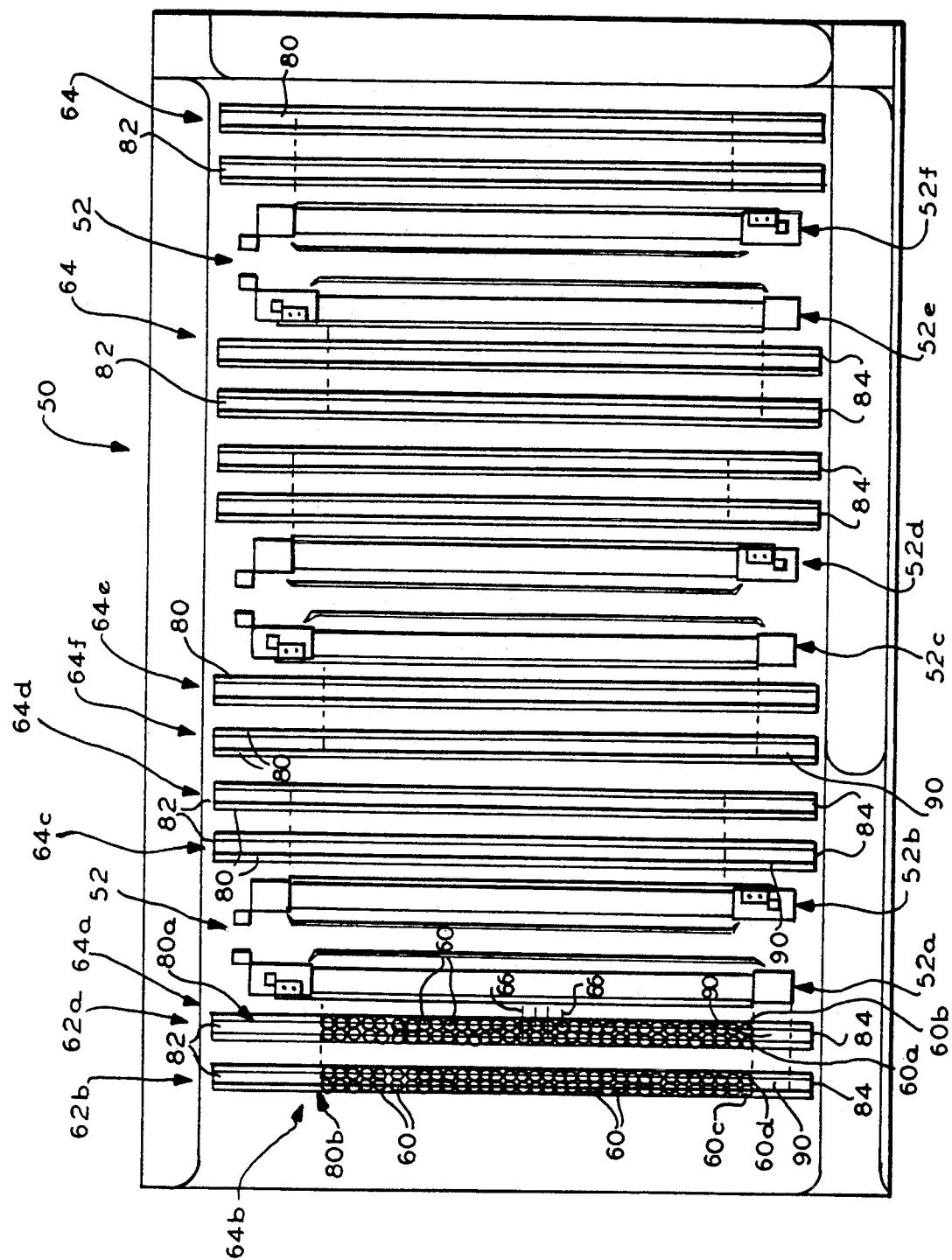
FIG. 1 is a schematic plan view of a portion of a manufacturing facility showing an area thereof where sliver is spun into yarn or thread and which incorporates the instant invention.
Figure 18:
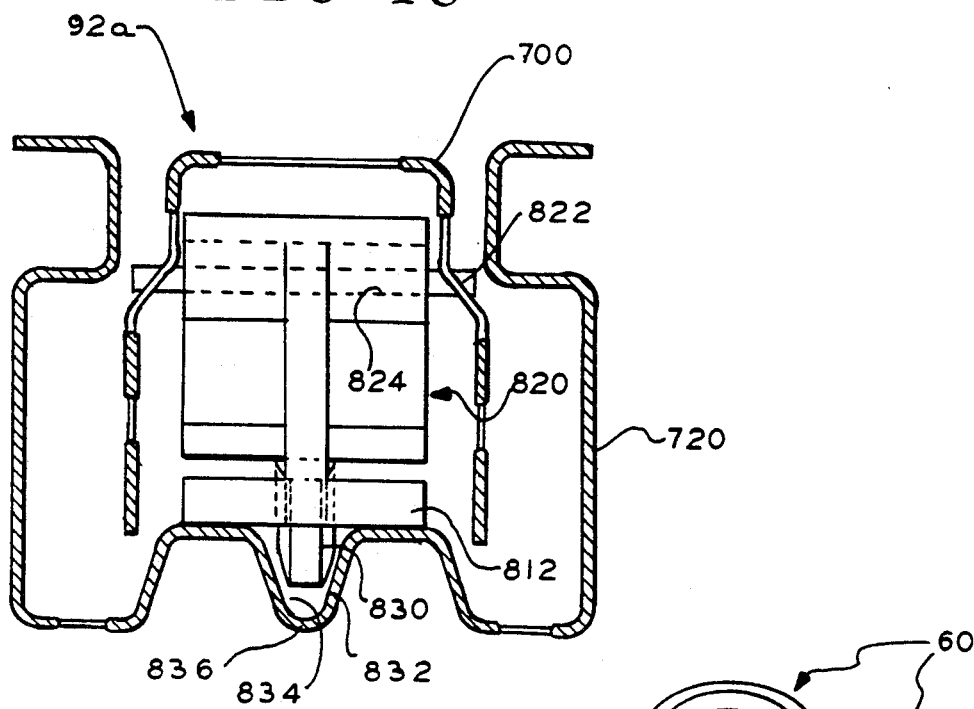
FIG. 18 is a vertical section of the article transport mechanism taken on line 18—18 of FIG. 15.

With reference to FIG. 1 there is generally shown at 50 a manufacturing facility including a plurality of work stations 52 which in this instance comprise spinning machines which spin sliver into yarn or thread. Work station machines 52 are conventional yarn or thread spinning machines each of which spins a number of spools of yarn or thread at the same time each at a particular one of a number of positions within the respective machine 52.

Figure 2:
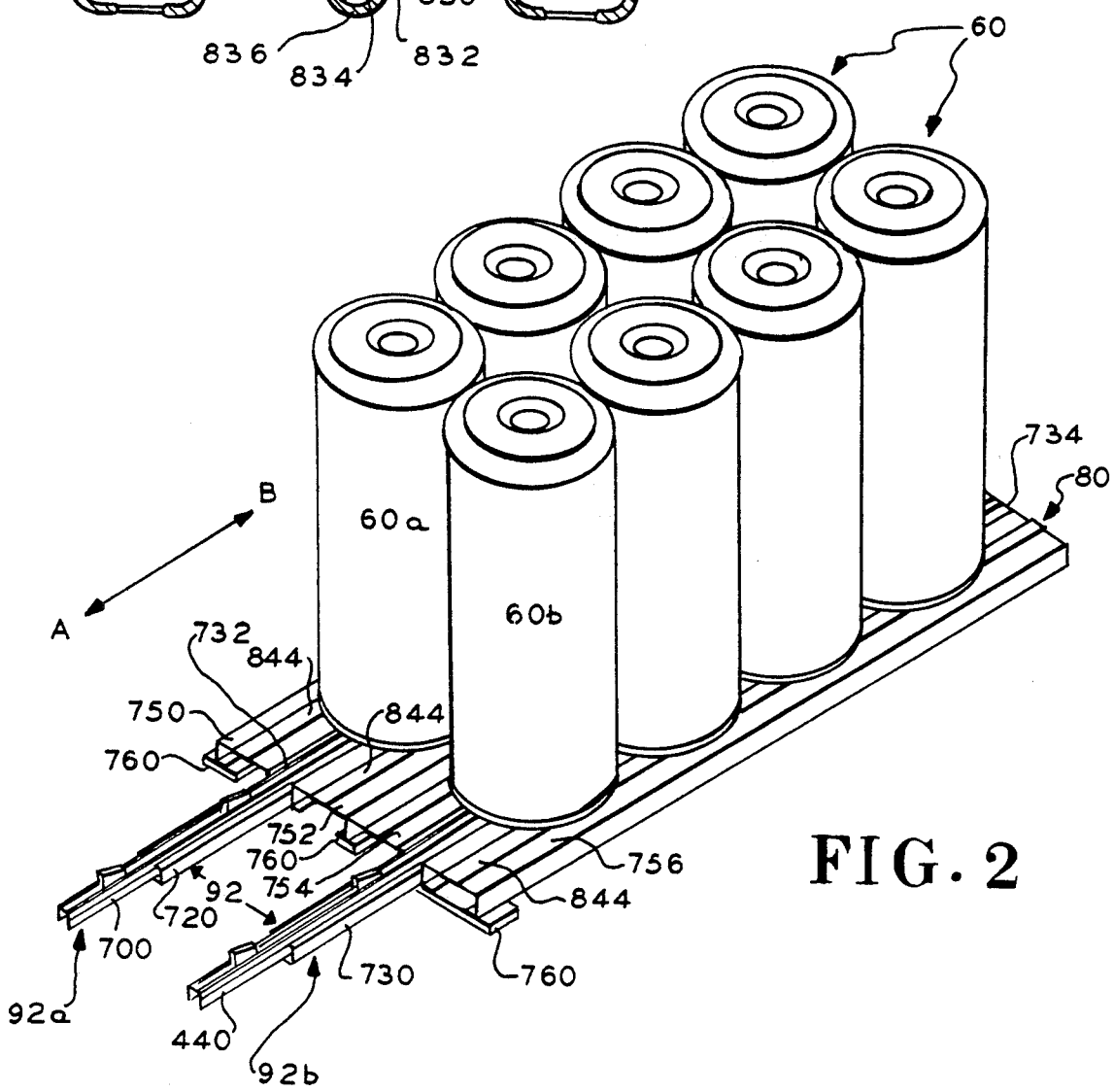
FIG. 2 is a schematic, in isometric, of a small segment of an output end of the sliver can support and transport mechanism for one of the spinning work stations of the facility of FIG. 1 incorporating the instant invention and cut away in part to better show details thereof.

A separate rope-like arrangement of sliver (not shown) is provided to each spinning position of each machine 52. Each such rope-like arrangement of sliver is provided from previous and generally conventional manufacturing processes (not shown) and constitutes discontinuous filaments of cotton, wool or the like that have been placed into the continuous and loosely arranged rope-like arrangement commonly called "sliver." The sliver ropes are placed in open topped, relatively tall cans or containers, such as containers 60 (FIGS. 1 and 2); with a plurality of such containers disposed in an array 62 at materials stations 64 where containers 60 are positioned in proximity to and for cooperation with each machine 52. Containers 60 have only been shown disposed for cooperation with machine 52a (FIG. 1) to simplify the drawings and description; it being understood that similar arrangements of containers 60 would be provided for all such machines 52 (52b-52f, etc) which are in operation.

Since many spools of yarn or thread (not shown) are to be spun by each machine 52 a comparable number of sliver ropes 66 (FIG. 1) are fed each from a container 60 to a particular spinning position of machine 52. In manufacturing facility 50 of FIG. 1 two rows 60a and a 60b of sliver containers 60 are positioned in an array 62a at materials station 64a to feed sliver ropes 66 to machine 52a. Other manufacturing facilities or spinning machines may utilize a single row of containers 60 or more than two rows of such containers 60.

The spinning of sliver into yarn or thread, like many other processes, is a continuous process and, as such, as the input feed material, in this instance sliver rope 66, becomes exhausted a new supply of input feed material must be established. Continuous input feed of sliver rope 66 for each spinning position of machine 52 is accomplished by providing a back-up sliver container 60 for each sliver container 60 in use. The back-up sliver containers 60 for feed containers 60, in rows 60a and 60b are disposed in an array 62b at a materials station 64b in rows 60c and 60d (FIG. 1). Thus, as a sliver rope from a container 60 in row 60a or 60b is used up (or about to be used up) a back-up sliver rope 66 from a similarly positioned sliver container 60 in row 60c or 60d is connected (in conventional manner) to the sliver rope 66 from container 60a or 60b respectively and the continuous material in-put feed continues from that container. Once the input feed is transferred to a container 60 in row 60c or 60d provision for further back-up must be made for the continuous process to continue. Containers 60 filled with sliver rope 66 must now be placed in respective rows 60a, 60b to become the back-up containers for containers 60 in rows 60c and 60d. Thus the empty containers 60, in rows 60a and 60b must be replaced by containers 60 that are full with sliver ropes 66. The process, thus, shifts back and forth from containers in rows 60a, 60b to containers in rows 60c and 60d and then back to 60a and 60b, etc. [The use of designations "a", "b", "c", "d" etc., are for reference and differentiation of position only and not for indicating primary or secondary or the like].

In general, the connecting of sliver ropes 66 from their respective containers 60 is accomplished by people moving around manufacturing facility 50 between and about containers 60 and machines 52. It is in that same environment of shifting people that empty sliver containers 60 must be removed and replaced by containers 60 with sliver ropes 66. To accomplish that containers 60 (i.e. 60a, 60b, at materials station 64a, and/or 60c, 60d at materials station 64b, etc.,) are respectively disposed upon material support and transport mechanisms or assemblies 80; their being one such support and transport assembly 80 for each array 62 at each materials station 64. Thus, work station 52a which includes two arrays of sliver containers 60 (i.e. 60a/60b and 60c/60d) is provided with two material support and transport assemblies 80a and 80b. Since assemblies 80A and 80b are identical in construction only one such assembly 80 will be described in detail.

Figure 3:
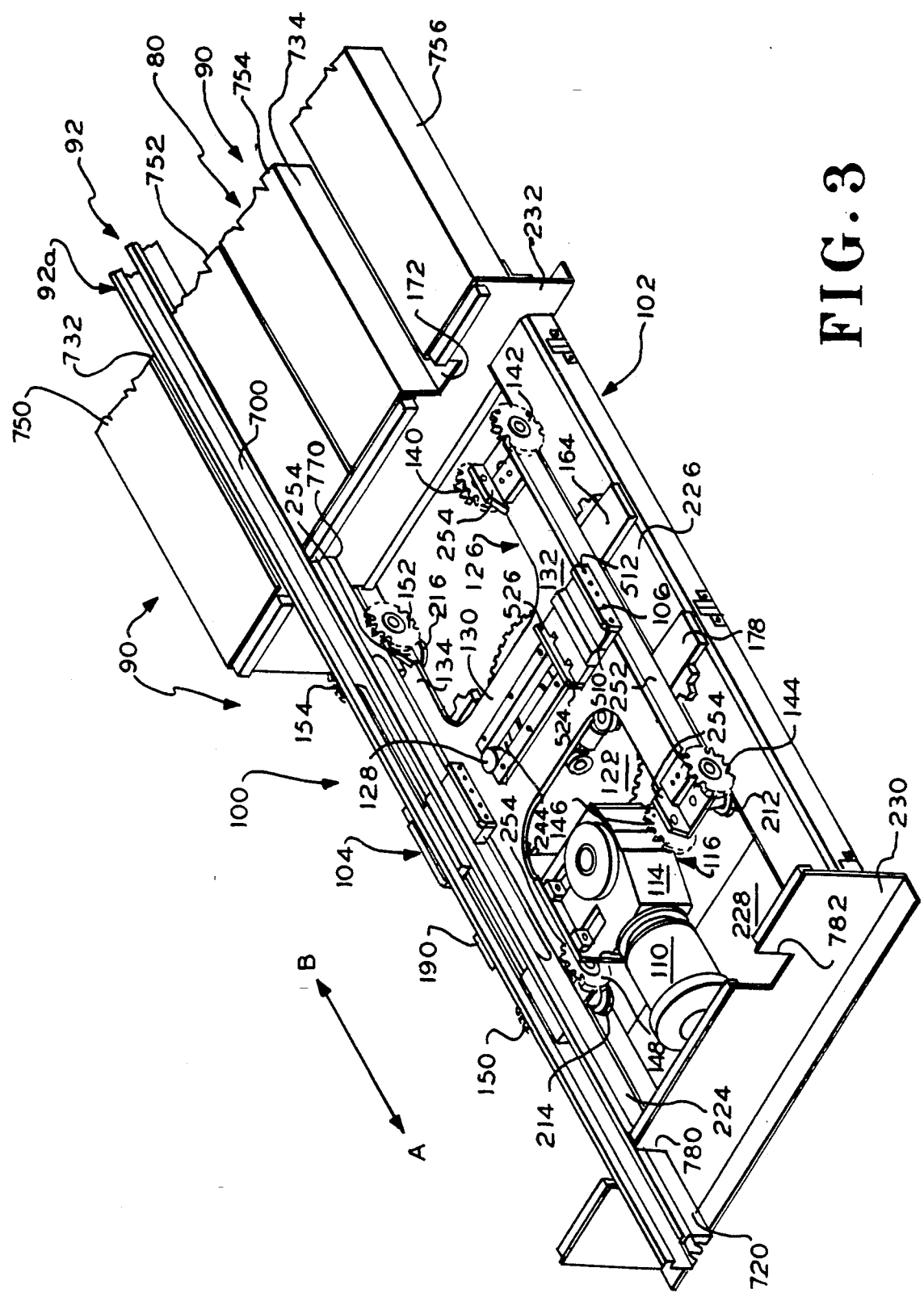
FIG. 3 is an isometric view of the drive mechanism for the article (sliver can) transport mechanism of FIG. 2, incorporating the instant invention, cut away in part and with parts removed to better show details thereof.

Each materials support and transport assembly 80 (FIGS. 1-3) serves to support a number of sliver containers 60 and, when needed to do so, to move sliver containers 60 from an input end 82 (FIG. 1) of their respective materials station 64 towards and to an output end 84 of their respective materials station 64. Each materials support and transport assembly 80 includes a housing assembly 90 (FIGS. 1-3) which supports and houses a parallel pair of article transport assemblies 92a (FIGS. 2, 3 and 6) and 92b (FIGS. 2 and 6) for transporting sliver containers 60a, 60b from input end 82 to output end 84 of materials station 64 as will be hereinafter described in greater detail. While materials support and transport assembly 80 has been shown and described as including a pair of article transport assemblies 92 it may just as well include only a single such article transport assembly 92 or it may include more than two such article transport assemblies 92. Housing assembly 90 is shown as disposed and supported upon a floor of manufacturing facility 50 but it may just as well be disposed upon a support at a predetermined position above such floor or within a channel formed in said floor and below the level thereof.

A transport drive assembly 100 (FIGS. 3-6) is housed and supported within a transport drive assembly housing 102 disposed intermediate input end 82 and output end 84 of materials station 64 but preferably proximate output end 84 thereof. Article transport assemblies 92 (only 92a shown in FIG. 3 with 92a and 92b shown in FIGS. 2 and 6) extend through housing 102 and are connected to transport drive assembly 100 through transport attachment assemblies 104, 106 as will be hereinafter explained in greater detail.

Figure 4:
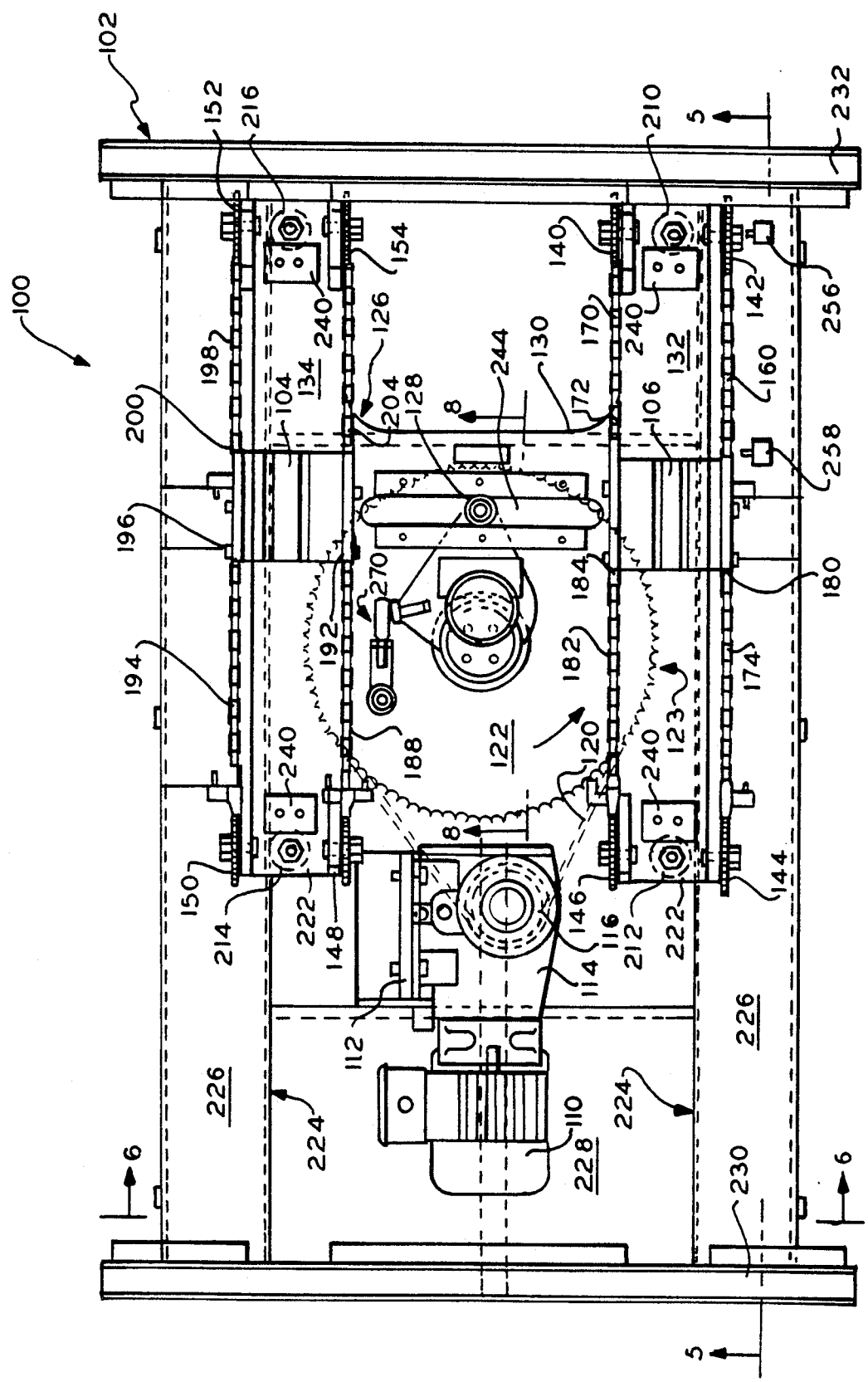
FIG. 4 is a plan view of the drive mechanism for the article transport mechanism of FIG. 2, incorporating the instant invention, with covers removed, most of the drive mechanism being shown in FIG. 3.

A motor assembly 110 (FIGS. 3-6) is supported upon and secured to suitable mounts 112 (FIG. 4) within housing 102 and includes an appropriate and conventional gearing unit 114 (FIGS. 3-5) terminating at an output sprocket 116 (FIGS. 4 and 6). Suitable and conventional controls and power are conventionally connected to and control the operation of motor assembly 110. A drive chain 120 (FIG. 3) extends about motor output sprocket 116 and about a drive sprocket assembly 122 (FIGS. 3-7) which, in turn, coacts with and drives a scotch yoke assembly 126 (FIGS. 3-6) through a cam follower 128 (FIGS. 3, 4 and 7) as will be hereinafter explained in greater detail. Such yoke assembly 126 supports and drives, in a reciprocatory manner, transport drives 104, 106 and through same transport assemblies 92.

A generally "H" shaped yoke plate 130 (FIGS. 3-5), of scotch yoke assembly 126, supports, proximate the respective extremities of each of its legs 132, 134 of the "H" a pair of spaced and rotationally mounted transport chain sprockets: with sprockets 140, 142 (FIGS. 3 and 4) and 144, 146 (FIGS. 3, 4 and 6) so carried by leg 132; and sprockets 148, 150; and 152, 154 (FIGS. 3 and 4) so carried by leg 134. A transport roller chain 160 (FIGS. 4 and 5) has an end 162 (FIG. 5) thereof secured to a chain anchor arm 164 (FIGS. 3 and 5) that is fixedly secured to transport drive housing 102 as by welding or the like; and extends therefrom about sprocket 142 to have its other end 166 (FIGS. 4 and 5) secured to transport attachment assembly 106. A transport roller chain 170 (FIG. 4) has a similar end (not shown) also secured to chain anchor arm 164 and extends therefrom about sprocket 140 to have its other end 172 secured to assembly 106. A transport roller chain 174 (FIGS. 4 and 5) has an end 176 (FIG. 5) thereof secured to a chain anchor arm 178 (FIGS. 3 and 5) also fixedly secured to transport housing 102 as by welding or the like; and extends therefrom about sprocket 144 (FIGS. 4 and 5) to have its other end 180 secured to assembly 106. A transport roller chain 182 (FIG. 4) has a similar end (not shown) also secured to chain anchor arm 178 (FIGS. 3 and 5) and extends therefrom about sprocket 146 to have its other end 184 secured to assembly 106.

In similar fashion a transport roller chain 188 (FIG. 4) has one of its ends (not shown) secured to a chain anchor arm 190 (FIG. 3) that is fixedly secured to transport housing 102 as by welding in a position aligned with but spaced from arm 178; and extends therefrom about sprocket 148 (FIG. 4) to have its other end 192 secured to transport attachment assembly 104. Another transport roller chain 194 has one of its ends secured to anchor arm 190 and extends therefrom around sprocket 150 to have it s other end 196 secured to attachment 104. A similar roller chain 198 has one of its ends (not shown) secured to a similar anchor arm (not shown) carried by and secured to housing 102 as by welding but in a disposition thereon spaced from but aligned with anchor arm 164 and extends therefrom about sprocket 152 to have its other end 200 secured to attachment 104. A further roller chain 202 has one of its ends (not shown) secured to the same anchor arm (not shown as chain 198 and extends therefrom about sprocket 154 to have its other end 204 secured to attachment 104.

Chains 160, 170, 174, 182, 188, 194, 198 and 202 are of the roller chain type and are sized and disposed about respective sprockets 140-154 with first ends secured to housing 102 and second ends to transport attachments 104, 106 respectively and coact as part of such yoke assembly 126 to provide a relatively conventional linear motion doubling for attachments 104, 106 and for the movable members of transport assemblies 92a, 92b respectively secured thereto. Thus, for each increment of movement of yoke plate 130 in the directions of arrows A or B (FIG. 4), generated as will be hereinafter described, attachments 104, 106 and said movable members of transports 92a, 92b respectively will move two such increments of linear movement. This coaction to provide the double incremental movement permits use of a smaller transport drive assembly housing 102 and the use of smaller components with comparable savings in weight, cost and associated mechanisms.

Also disposed proximate the extremely of each leg 132, 134 (FIG. 4) of yoke plate 130 are guide rollers or wheels 210 (FIGS. 3, 4 and 6), 212, 214 (FIG. 5) and 216 (FIG. 3) each positioned by a guide roller mount 218 (FIG. 6) and rotatively secured in place as by a bolt 220 or the like. Guide rollers 210-216 are conventional bearings but other rollers or wheels may do as long as an outside surface 222 (FIGS. 4 and 6) thereof is disposed for coaction with, and coacts with an interior but outside surface 224 of tubes 226 which together with a base plate 228 (FIGS. 3, 4 and 6) and end plates 230, 232 (FIGS. 3, 4 and 5) comprise transport drive assembly housing 102. Tubes 226, base plate 228 and end plates 230, 232 are preferably formed of metal and are secured together by suitable and conventional means such as welding, or the like; but other materials and means of securing the members together may be utilized. A guide block 240 is positioned on top of each leg 132, 134 of yoke plate 130, proximate the respective ends thereof, and is secured in place as by threaded fasteners or the like. The upper surfaces of each such guide block 240 are disposed to engage lower surfaces of the pertinent transport assembly 92 and by doing so to thus limit any upward travel of scotch yoke assembly 126 (i.e. in the direction of arrow X-FIG. 6) to maintain cam follower 128 (FIGS. 3, 4 and 8) within an elongated cam slot 244. A wear guide 246 is disposed along each elongated side of cam slot 244 and extends down along the sides 248 (FIG. 8) of an elongated slot 250 formed through yoke plate 130. Elongated bars 252 (FIG. 3), disposed along each outside side of yoke plate legs 132, 134 and secured in place by suitable means such as welding, serve to rotatively support sprockets 142, 144, 150 and 154. Short bars 254, disposed proximate the end of each inside side of yoke plate legs 132, 134 and secured in place by suitable means such as welding, serve to rotatively support sprockets 140, 146, 148 and 152. A proximity switch 256 (FIG. 4) is disposed on top of tube 226 proximate end plate 232 while a similar proximity switch 258 is disposed on top of tube 226 and spaced a predetermined distance from switch 256. Switches 256, 258 are suitably and conventionally connected in circuit and to controls and serve to signal the presence of the end of arm 132 of yoke plate 130 at the respective limits to its travel as well be hereinafter described.

Some space has been left between the outside surface of cam follower 128 and the surfaces of wear guides 246 that face and define cam slot 244 to better show the components. It should, however, be understood that such spacing in the actual construction is minimal to facilitate the proper coaction between cam follower 128 as it travels in slot 244 and coacts with wear guides 246 and thereby with scotch yoke assembly 126.

Figure 7:
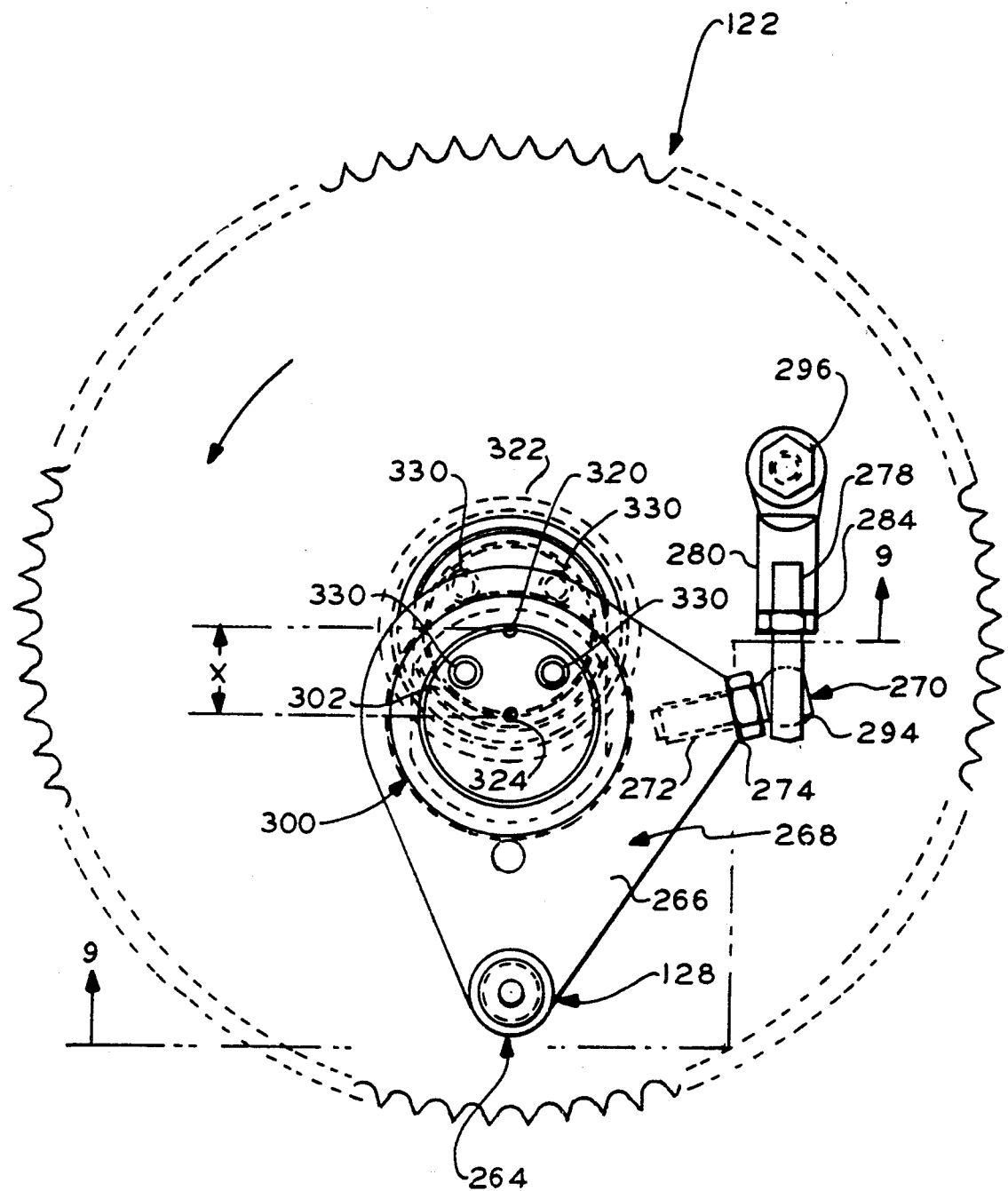
FIG. 7 is a plan view of the drive sprocket for the drive mechanism FIGS. 4-6, removed therefrom and enlarged and showing the drag link mechanism thereon, to better show details thereof.
Figure 8:
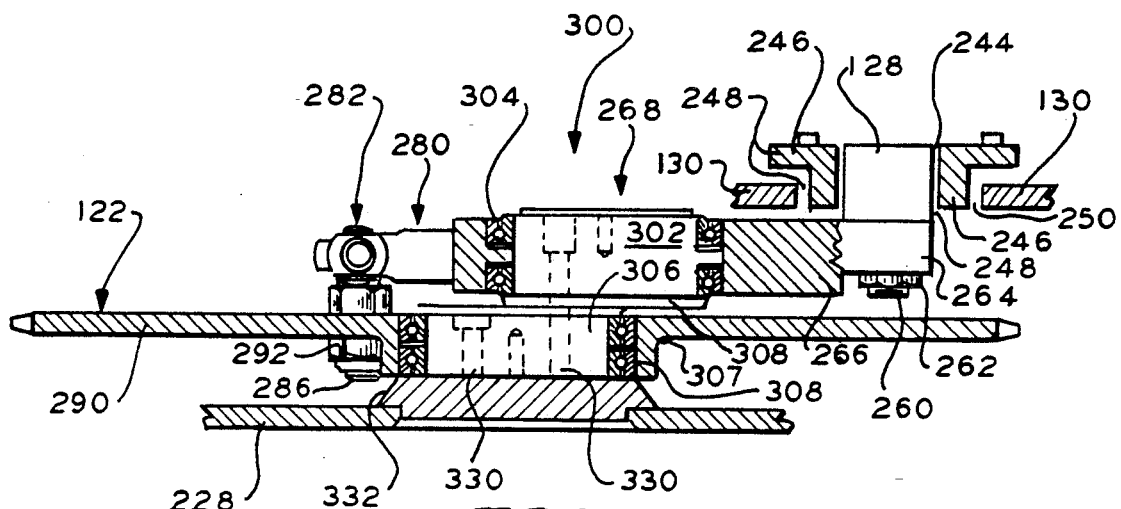
FIG. 8 is a vertical section taken on line 8—8 of FIG. 4.
Figure 9:
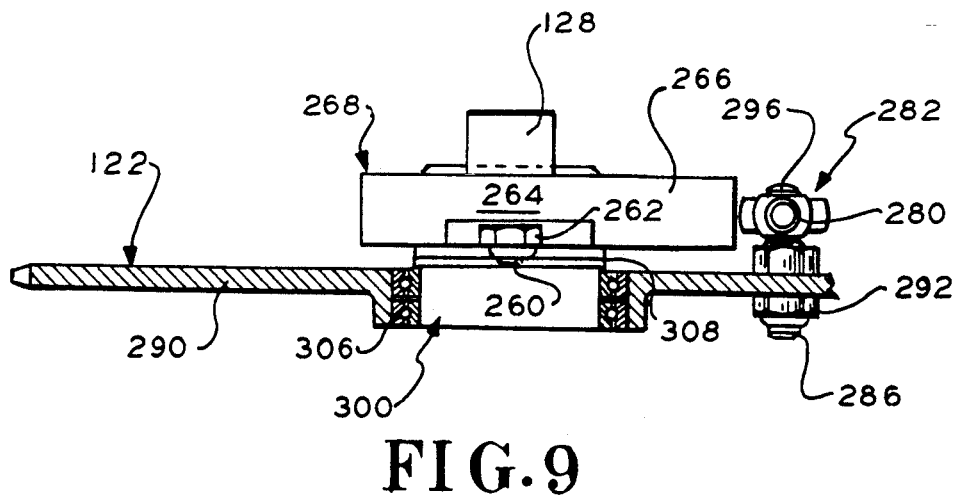
FIG. 9 is a vertical section taken on line 9—9 of FIG. 7.

Cam follower 128 is of conventional construction and includes a stem 260 (FIGS. 8 and 9) which is externally threaded proximate its end to receive an internally threaded nut 262 to thereby rotatively secure cam follower 128 proximate an end 264 of a drag link plate 266 of a drag link assembly 268 (FIGS. 7, 8 and 9).

A first spherical rod end 270 (FIGS. 4 and 7) of conventional construction, has a first externally threaded stud 272 (FIG. 7) threaded into drag link plate 266 at a flat 274 formed on plate 266. A second externally threaded stud 278 of rod end 270 is threaded into an internally threaded stud 280 (FIGS. 7 and 9) of a second spherical rod end 282, also of conventional construction, and is secured in place therein by a jam nut 284 (FIG. 7). An externally threaded stud 286 (FIGS. 8 and 9) of rod end 282 extended through an appropriate opening (not shown) formed through a drive sprocket 290 of drive sprocket assembly 122 and is secured in place by jam nut 292. Rod end 270 includes a spherical joint 294 (FIG. 7) and rod end 282 includes a spherical joint 296 (FIGS. 7 and 9); which joints 294, 296 and the mounting thereof to drag link plate 266 and drive sprocket 290 permit a universal freedom of action in rotative movement of drag link assembly 268 with respect to and with drive sprocket assembly 140 as will be hereinafter explained.

Drag link assembly 268 is not only connected to drive sprocket 290 through spherical rod ends 270, 282 but is rotatively and eccentrically mounted with respect to drive sprocket 290 through an eccentric mounting assembly 300 (FIGS. 7 and 9). A first portion 302 (FIGS. 7 and 9) of eccentric mounting assembly 300 extends into a suitable opening formed through drag link plate 260. A bearing assembly 304 (FIG. 8) is disposed around portion 302 and within the opening through drag link plate 266 and rotatively mounts drag link plate 266 to mounting assembly 300. A second portion 306 of mounting assembly 300 is formed integral with first portion 302 thereof but is spaced therefrom by a central piece 308. A suitable opening is formed through a hub 307 formed on drive sprocket 290 to receive second portion 306. A bearing assembly 308 is disposed about secured portion 306 and within the opening through drive sprocket 290 and rotatively mounts drive sprocket 290, drive sprocket assembly 122 and drag link assembly 268 within housing 102.

First portion 302 and second portion 306 of mounting assembly 300 are each preferably formed as solid cylinders of predetermined diameter and of a thickness corresponding to that of drag link plate 266 and hub 307 of sprocket 290 respectively. A center 320 of first portion 302 and about which drag link plate 266 rotates is spaced by a predetermined distance "X" (FIG. 7) along a diameter line 322 from a center 324 of portion 306 and about which sprocket 290, and all members carried by sprocket 290, rotate. The offset of centers 320, 324 establishes the eccentric mounting of drag link assembly 268 with respect to drive sprocket 290.

A number of externally threaded members 330 (FIGS. 7 and 9), which extend through openings formed through eccentric mounting assembly 300 and into an eccentric support 332 (FIG. 8) suitably secured to base plate 228 as by welding or the like, secure eccentric mounting assembly 300, drive sprocket assembly 122 and drag links assembly 268 within housing 102.

In general a scotch yoke assembly converts rotary motion into harmonic reciprocatory motion. Scotch yoke assembly 126 by receiving its drive from motor assembly 110 through drive sprocket assembly 122 and through drag link assembly 268 receives a modified rotary motion and converts that into a modified harmonic reciprocatory motion. That modified reciprocatory motion, due to the mounting of scotch yoke assembly 126 by way of chains 160, 170, 174, 182. 188. 194, 198 and 202 (as described above) produces two increments of linear motion of articles being moved by article transport assemblies 92a, 92b (in the directions of arrows A and B-FIG. 4) for each increment of movement of scotch yoke assembly 126 (in the corresponding direction). The modification to the harmonic reciprocatory motion effected by drag link assembly 268 is such that on the pull stroke for article transport assemblies 92a, 92b (i.e. the stroke of scotch yoke assembly 126 in the direction of arrow A-FIG. 4) article transport assemblies 92a, 92b effect movement of an article or articles in the direction of arrow A (FIG. 4) at a first predetermined speed that generates a predetermined amount of pull to advance articles (such as sliver containers 60-FIG. 2) in the direction of arrow A-FIG. 2; and on the return stroke for article transport assemblies 92a, 92b (i.e. the stroke of scotch yoke assembly 126 in the direction of arrow B-FIG. 4) the article transport portion of article transport assemblies 92a, 92b move in the direction of arrow B (FIG. 4) at a second predetermined speed, that is quicker than said first predetermined speed, to more rapidly return said article transport portions of article transport assemblies 92a, 92b to their start positions. The slower first predetermined speed permits the availability of stronger forces to effect article movement; while the quicker second predetermined speed effects a relatively quick return of the article transport portions of transport assemblies 92a, 92b when they do not have to advance articles to thus reduce transport cycle time. FIG. 10 illustrates the cycle time and comparison of FIG. 10 to the sketches of FIGS. 10a through 10e correlates the position of cam follower 128, drag link assembly 268 and scotch yoke assembly 126 to the cycle of transport assemblies 92a, 92b as shown in FIG. 10.

Figure 13:
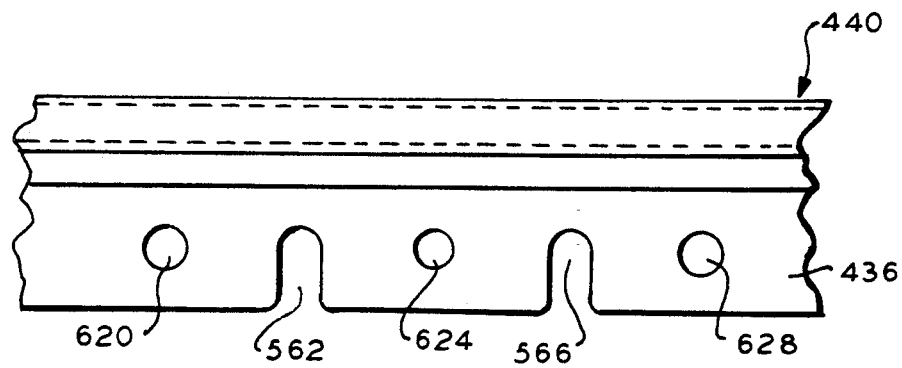
FIG. 13 is a side view of a small segment of the article transport beam showing the portion thereof that is to be connected to the coupling of FIGS. 11 and 12.

The hereinabove described modified harmonic, increment doubled, reciprocatory movement of scotch yoke assembly 126 is imparted to the article transport portion of article transport assemblies 92a (FIGS. 2 and 3) and 92b (FIG. 2) through transport and chain attachment assemblies 104 (FIGS. 2, and 4) and 106 (FIGS. 2, 4 and 5) respectively. Attachment assemblies 104, 106 are identical in construction and in their respective coaction with article transport assemblies 92. Accordingly, only attachment assembly 106 and its coaction with article transport assembly 92b will be described in detail and with particular reference to FIGS. 11-13.

Attachment assembly 106 (FIGS. 3-5, 11 and 12) includes: a centrally disposed beam spacer block 400 (FIGS. 11 and 12); a pair of clamp blocks 402, 404, disposed one to each side of beam spacer block 400; and a pair of chain attachment brackets 406, 408 disposed one to each of the sides of clamp blocks 402, 404 respectively that are not disposed against spacer block 400. A number of holes 420, 422, 424, 426 and 428 (FIG. 11) extend through spacer block 400 from a first side 430 thereof to a second side 432 thereof. Holes 420–428 are equally spaced from each other in block 400; with holes 422 and 426 having formed therein internal threads. A side 434, of clamp block 402, is disposed facing side 430 of spacer block 400 but to be spaced therefrom by a side wall 436 of an article transport beam 440 of article transport beam assembly 92b. A side 444, of clamp block 404, is disposed facing side 432 of spacer block 400 but so as to be spaced therefrom by a side wall 446 of article transport beam 440. A first set of holes 450, 454, 458, extending into clamp block 402 from side 434 thereof, are aligned respectively with holes 420, 424 and 428 of spacer block 400. A second set of holes 462, 466, also extending into clamp block 402 from side 434 thereof are aligned respectively with internally threaded holes 422 and 426 of spacer block 400 and with notches 472, 476 respectively formed to extend into clamp block 402 from a side 478 thereof. Also extending into clamp block 402 from side 478 thereof and aligned with but of lesser diameter than holes 450, 454 and 458 thereof are internally threaded holes 480, 484, 488 respectively.

Chain attachment bracket 406 includes a pair of sides 490, 492 with side 490 thereof disposed against side 478 of clamp block 402. A number of holes 500, 502, 504, 506, 508 extend through chain attachment bracket 406 with holes 500, 504 and 508 of a first diameter and aligned respectively with threaded holes 480, 484 and 488 of clamp block 402 and with holes 502 and 506 of a second diameter, larger than said diameter of holes 500, 504 and 508, and aligned with notches 472, 476 and holes 462 and 466 of clamp block 402. Chain attaching holes 510, 512 (FIGS. 3 and 11) extend through bracket 406 from sides 490 to 492 thereof proximate each of its ends.

Clamp block 404 is identical to but disposed as a mirror image of clamp block 402. As such clamp block 404 includes: three spaced but not internally threaded holes 450, 454, 458 extending into clamp block 404 from its side 444 and aligned with holes 420, 424 and 428 of spacer block 400; two spaced holes 462, 466 extending into clamp block 404 from its side 444 and aligned with holes 422 and 426 of spacer block 400 and with notches 472 and 476 respectively extending into clamp block 404 from a side 514 thereof; and three spaced and internally threaded holes 480, 484, 488 extending into clamp block 404 from side 514 thereof and axially aligned with holes 450, 454 and 458 respectively.

Chain attachment bracket 408 is identical with chain attachment bracket 406 and includes: a pair of sides 520, 522 with side 520 thereof disposed against side 514 of clamp block 404; five holes 500, 502, 504, 506 and 508 extending through bracket 408 with holes 500, 504 and 506 of a first diameter and aligned respectfully with threaded holes 480, 484 and 488 of clamp block 404; and with holes 502 and 506 of a second diameter larger than said diameter of holes 500, 504, and 508 and aligned with notches 472, 476 and holes 462 and 466 of clamp block 404. Chain attaching holes 524, 526 (FIGS. 3 and 11) extend through bracket 408 from side 520 to side 522 thereof proximate each of its ends.

A pair of cap screws 552, 556, are placed through holes 462, 466 respectively of clamp block 402 and screwed into internally threaded holes 422, 426 of spacer block 400, from side 430 thereof secure clamp block 402 to spacer block 400 with wall 436 of article transport beam 440 disposed between side 434 of clamp block 402 and side 430 of spacer block 400. A pair of elongated slits 562, 566 (FIG. 13) extend up from an edge of wall 436 of article transport beam 440 and are disposed to permit the threaded shanks 572, 576 of cap screws 552, 556 (FIG. 11) to pass therethrough for purposes to be hereinafter explained. Socket heads 582, 586 of cap screws 552, 556 respectively are disposed in notches 472, 476 of clamp block 402 and in alignment with holes 502, 506 of chain attachment bracket 406.

A number of pins or dowels 600, 604, 608 are press fit into holes 450, 454 and 458 respectively of clamp block 402 so that ends 610, 614 and 618 respectively thereof project out from side 434 of clamp block 402 and into and through holes 620, 624 and 628 (FIG. 13) of side wall 436 of article transport beam 440 and a short distance into holes 420, 424 and 428 of spacer block 400 from side 430 thereof. A number of cap screws 630, 634, 638 (FIG. 11) are passed through holes 500, 504 and 508 respectively of chain attachment bracket 406 to be threaded into internally threaded holes 480, 484 and 488 respectively of clamp block 402. The threaded shanks of cap screws 480, 484, 488 are sized so that their ends do not meet the interior ends of pins 600, 604 608 respectively and so that spaces 639 (FIGS. 11 and 12) are provided therebetween.

Clamp block 404 and chain attaching bracket 408 are secured to spacer block 400 in a manner similar to that for clamp block 402 and bracket 406. Thus, a pair of cap screws 552, 556 are inserted through internally threaded holes 462, 466 respectively of clamp block 404 and screwed into internally threaded holes 422, 426 of spacer block 400, from side 432 thereof secure clamp block 404 to spacer block 400 with side wall 446 of article transport beam 440 disposed between side 444 of clamp block 404 and side 432 of spacer block 400. A pair of elongated slits (not shown) similar to and aligned with slits 562, 566 (FIG. 13) of side wall 436 extend up from an edge of side wall 446 of article transport beam 440 and are disposed to permit the threaded shanks 572, 576 of cap screws 552, 556 (FIG. 11) to pass therethrough for purposes to be hereinafter explained. Socket heads 582, 586 of cap screws 552, 556 respectively are disposed in notches 472, 476 of clamp block 404 and in alignment with holes 502, 506 of chain attachment bracket 408.

A number of pins or dowels 600, 604, 608 are press fit into holes 450, 454 and 458 respectively of clamp block 404 so that ends thereof (not shown but similar to ends 610, 614 and 618 respectively) project out from side 444 of clamp block 404 and into and through holes provided through side wall 446 of article transport beam 440 [not shown but similar to holes 620, 624 and 628 (FIG. 13) of side wall 436 of article transport beam 440]and a short distance into holes 420, 424 and 428 of spacer block 400 from side 432 thereof. A number of cap screws 630, 634, 638 (FIG. 11) are passed through holes 500, 504 and 508 respectively of chain attachment bracket 406 to be threaded into internally threaded holes 480, 484 and 488 respectively of clamp block 404. The threaded shanks of cap screws 480, 484, 488 are sized so that their ends do not meet the interior ends of pins 600, 604, 608 respectively and so that spaces 639 (FIGS. 11 and 12) are provided therebetween.

When attachment assembly 106 is assembled as described above end 166 of chain 160 (FIGS. 3 and 4) is secured to attachment assembly 106 at hole 512. End 180 of chain 174 is similarly secured to attachment assembly 106 at hole 510 thereof. End 184 of chain 182 is similarly secured to attachment assembly 106 at hole 524 thereof and end 17 of chain 170 is similarly secured to attachment assembly 106 at hole 526 thereof.

Attachment assembly 104 (FIG. 4) is constructed of parts identical to those utilized for attachment assembly 106 and is assembled and attached the same way as described above for attachment assembly 106. Thus, when attachment assembly 104 is to be connected to chains 188, 194, 198 and 202 ends 192, 196, 200 and 204 respectively of said chains will be connected to holes provided through the chain attachment brackets 406, 408 of attachment assembly 104 in the manner that the respective chain ends were attached to chain attachment brackets 406, 408 of attachment assembly 106. Attachment assembly 104 is secured to its associated article transport beam 700 (FIGS. 2, 3 and 6) of article transport assembly 92a in the same manner as described above for securing attachment assembly 106 (FIGS. 11-13) to its associated article transport beam 440 of article transport assembly 92b.

When attachment assemblies 104, and 106 are secured to their respective article transport beams 440, 700 of article transport assemblies 92a, 92b as described above, the above described modified harmonic, increment doubled, reciprocatory movements of scotch yoke assembly 126 is imparted to article transport beams 440, 700 by attachment assemblies 104, 106; to reciprocate article transport beams 440, 700 in the direction of arrows A and B (FIG. 2) and thereby to move sliver cans 60a, 60b in the direction of arrow A as will be hereinafter described in greater detail.

Figure 11:
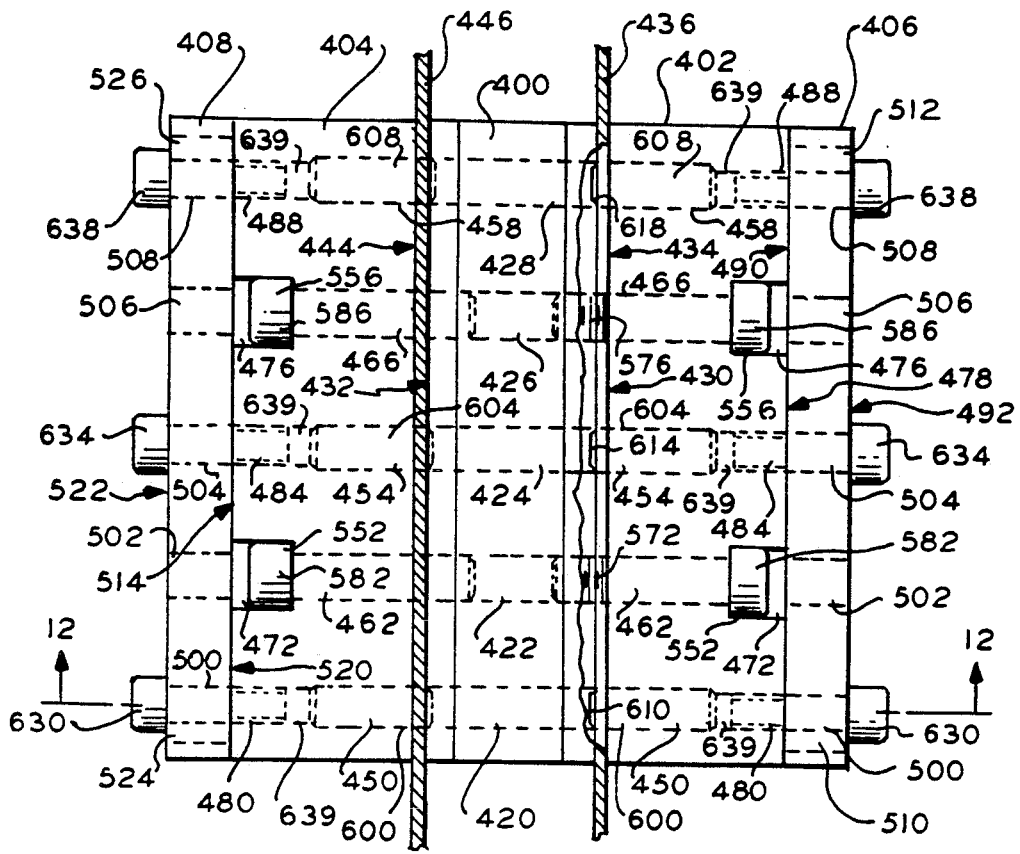
FIG. 11 is a plan view of the coupling device, incorporating the instant invention, for connecting the drive mechanism of the instant invention to the article transport mechanism of the instant invention with portions thereof cut away to better show details thereof and with portions of the transport beam of the article transport mechanism in section and connected thereto.
Figure 12:
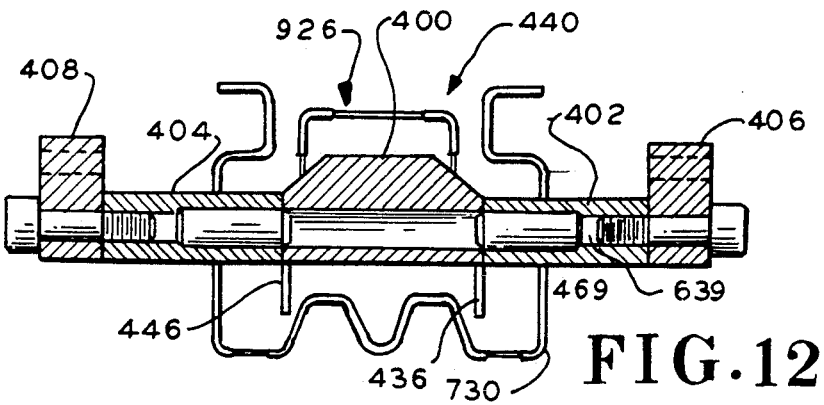
FIG. 12 is a vertical section taken along line 12—12 of FIG. 11 and schematically showing the coupling of FIG. 11 connected to the transport beam of the article transport mechanism and disposed for co-action and in relation to the stationary beam of the transport mechanism.

The servicing and maintenance of materials transport assembly 80 (FIG. 3), its associated article transport assemblies 92a and 92b and the transport drive assembly 100 therefore may require disconnection of article transport assemblies 92a and 92b from transport drive assembly 100 and subsequent reconnection thereof. The construction of attachment assemblies 104, 106 facilitates a relatively simple and easily accomplished connection and disconnection of article transport beams 440, 700 and transport drive assembly 100. FIGS. 11 and 12 show, and the description above describes, the connection of article transport beam 440 and attachment assembly 106. Attachment assembly 104 and article transport beam 700 are secured together in the same way and would be disconnected as hereinafter described for beam 440 and assembly 106.

When secured together the relationship of walls 436, 446 of article transport beam 440 and attachment assembly 106 will be as shown in FIGS. 11 and 12. Ends 610, 614 and 618 of pins 600, 604 and 608 respectively extend from clamp block 402 through holes 620, 624 and 628 respectively of side wall 436 of beam 440 and into holes 420, 424 and 428 of spacer block 400; while ends 610, 614, 618 of pins 600, 604 and 608 respectively extend from clamp block 404 through the holes in side wall 446 of beam 440 (i.e. the ones that are similar to and aligned with holes 620, 624 and 628 of side wall 436 of beam 440) and into the other ends of holes 420, 424 and 428 of spacer block 400. Cap screws 552, 556 secure clamp blocks 402 and 404 to spacer block 400 with side walls 436 of beam 440 tightly sandwiched between blocks 402 and 400 and with side wall 446 of beam 440 tightly sandwiched between blocks 404 and 400.

To separate article transport beam 440 from attachment assembly one need only loosen cap screws 552, 556 on both sides of spacer block 400. Access to the socket heads 582, 586 of cap screws 552, 556 is obtainable through holes 502, 506 respectively of clamp blocks 402, 404. The space in notches 472, 476 of clamp blocks 402, 404 is sized to permit cap screws 552, 556 to be backed out of holes 422, 426 of spacer block 400 but only until heads 582, 586 of cap screws 552, 556 in clamp block 402 abut against side 490 of chain attachment bracket 406 and heads 582, 586 of cap screws 552, 556 in clamp block 404 abut against side 520 of chain attachment bracket 408. The sizing of notches 472, 476 in clamp blocks 402, 404 is so selected that when cap screws 552, 556 are so backed out of holes 422, 426 of spacer block 400 that ends 610, 614 and 618 of pins 600, 604, 608 carried by respective clamp block 402, 404 move back out of holes 420, 424, 428 of spacer block 400 and back out of holes 620, 624, 628 in side walls 436, 446 of article transport beam 440. The threaded shanks 572, 576 of cap screws 552, 556 of clamp blocks 402, 404 respectively remain threaded into the respective ends of holes 422, 426 of space block 400; but the elongated open ended slots 562, 566 (FIG. 13) formed in side walls 436 (FIG. 11) and 446 of article transport beam 440 permit separation of article transport beams 440 and 700 from attachment assemblies 106, 104 and thus disconnection of transport drive assembly 100 from article transport assemblies 92a, 92b. Reconnection of article transport beams 440 and 700 to transport drive assembly 100 is easily accomplished by inserting side walls 436, 446 of beams 440, 700 between the side walls 430, 432 of spacer block 400 and the side walls 434, 444 of clamp blocks 402, 404 respectively with shanks 572, 576 of cap screws 552, 556 in slots 562, 566 of beams 440 and 700 and with pins 600, 604 and 608 carried by clamp blocks 402, 404 aligned with holes 620, 624 and 628 respectively in side walls 436, 446 of beams 440 and 700. Cap screws 552, 536 are then tightened projecting the respective ends 610, 614, 618 of pins 600, 604, 608 carried by clamp blocks 402, 404 through holes 620, 624, 628 in side walls 436, 446 of article transport beams 440, 700 and then into holes 420, 424 and 428 respectively on opposite sides of spacer blocks 400. When cap screws 552, 556 have been fully tightened article transport beams 440 and 700 are again securely assembled to transport drive assembly 100.

Article transport assemblies 92a (FIGS. 2, 3, 14, 15 and 18) and 92b (FIG. 2) each include an article transport beam 700 and 440 respectively that are, in turn, disposed for coaction with static beams 720 (FIGS. 2, 14, 15 and 18) and 730 (FIG. 2) respectively, as will be hereinafter described in more detail. The article transport assemblies 92a, 92b extend from input end 82 of materials support and transport assembly 80 to output end 84 thereof, with static beams 720, 730 disposed respectively in beam channels 732, 734 of housing assembly 90 of support and transport assembly 80. A number of channel members 750, 752, 754, 756 (FIGS. 2 and 3) are secured, by conventional means such as welding, threaded fasteners or the like to a base member 760 (FIG. 2) of housing assembly 80 with channel members 750, 752 spaced one from the other to form therebetween and above base member 760 beam channel 732 and with channel members 754, 756 spaced one from the other to form therebetween and above base member 760 beam channel 734. Beam channels 732, 734 end at notches 770, 772 formed in end plate 232 of transport drive assembly housing 102 but article transport assemblies 92a and 92b extend into housing 102 (only transport assembly 92a shown in FIG. 2) to be connected to attachment assemblies 104, 106 (as described above) and therefrom through housing 102 through notches 780, 782 formed in end plate 230 thereof. An additional section or sections of channel members 750, 752, 754 and 756 with beam channels 732, 734 may be disposed proximate end plate 230 of transport drive assembly housing 102 to receive article transport assemblies 92a and 92b depending upon the selected length thereof and the disposition of transport drive assembly 100 between input end 82 and output end 84 of materials support and transport assembly 80. Static beams 720, 730 are, in turn, disposed in beam channels 732, 734 respectively, extend the lengths thereof and are secured in position therewithin by welding, riveting, threaded members and the like.

Figure 14:
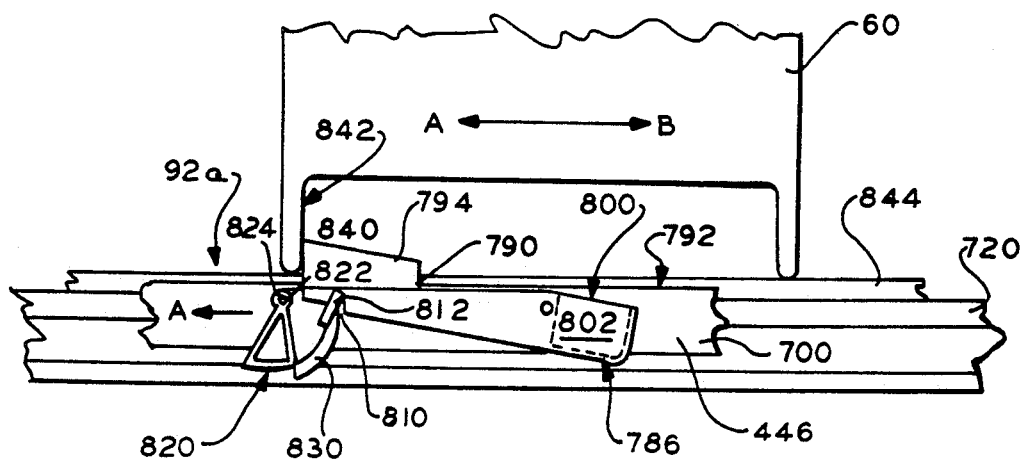
FIG. 14 is a small segment of the article transport mechanism of instant invention, cut away in part to better show details thereof, and showing same during an article pushing stroke thereof and with an article, in this instance a sliver can, in phantom and being moved thereby.
Figure 15:
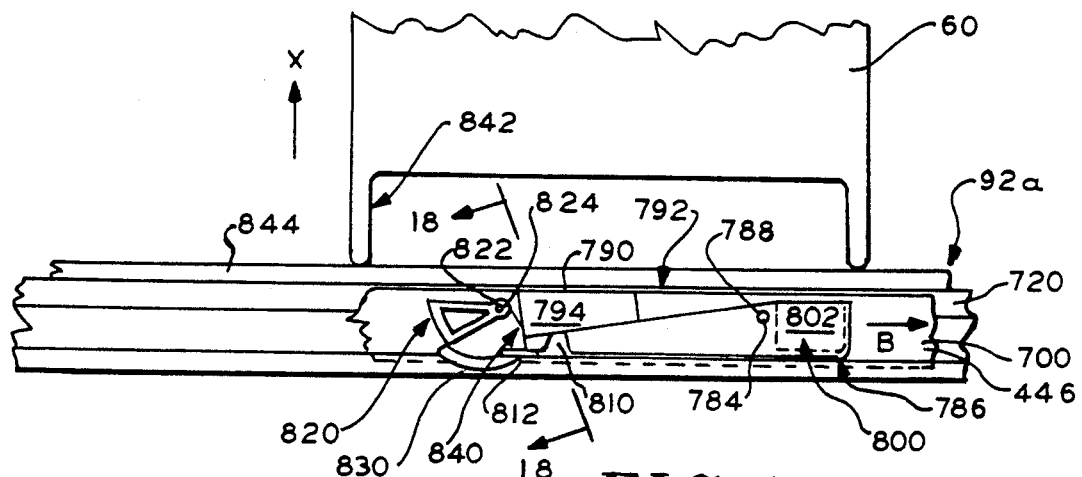
FIG. 15 is a similar small segment of the article transport mechanism of FIG. 14 showing same after the article has been moved its intended increment and during the return stroke or the article transport mechanism.
Figures 16, 17:
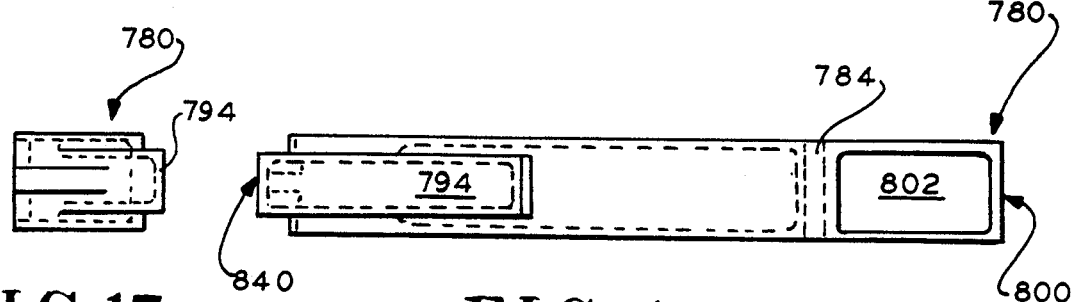
FIG. 16 is a plan view of an article finger of the article transport mechanism of FIGS. 14 and 15.
FIG. 17 is an end view of the article finger of FIG. 16.

Article transport assemblies 92a and 92b are identical in construction and function and so only assembly 92a will be described in detail. A plurality of article moving fingers or dogs 780 (FIGS. 2 and 14-18) are pivotally carried by article transport beam 700 for movement between an activated position (FIGS. 2 and 14) and a deactivated position (FIG. 15). A pivot pin 782 extends through a pivot hole 784 (FIG. 16) of each finger 780 and spans side walls 436, 446 of article transport beam 700 to be received in finger pin slots formed therethrough to so pivotally mount fingers 780. The spacing between the respective article moving fingers 780 is selected in relationship to the size of article (such as articles 60) to be moved by article transport assembly 92a. A plurality of appropriately sized openings 790 (FIGS. 14, 15 and 18) are formed through an upper wall 792 of article transport beam 700 to accommodate the movement of an article contacting member 794, disposed at one end of finger 780, between a raised position thereof disposed above the level of upper wall 792 of article transport beam 700 when finger 780 is in its activated position (FIG. 14) and a lowered position thereof disposed below the level of upper wall 792 of article transport beam 700 when finger 780 is in its deactivated position (FIG. 15). A pocket 800 is formed at the end of finger 780 opposite to where contacting member 794 is disposed. A weight 802 of suitable size and fabricated from a suitable material such as lead, concrete or the like may be disposed in pocket 800 to facilitate pivoting movement of finger 780 from its deactivated condition (FIG. 15) to its activated condition (FIG. 14).

A notch 810 (FIGS. 14 and 15) is formed on the underside of each finger 780 to receive a ledge 812 (FIGS. 14, 15 and 18) carried by a finger cam 820 pivotally carried by article transport beam 700; there being one such finger cam 820 for each finger 780. A pivot pin 822 (FIGS. 14, 15 and 18) extends through a hole 824 formed through cam 820 and has its ends disposed in cam slots formed through walls 436, 446 of article transport beam 700. A curved cam surface 830 (FIG. 18) is formed on finger cam 820 and when cam 820 is pivotally mounted to transport beam 700 is disposed for coaction with the side walls 832, 834 of a groove 836 that extends along the bottom of static beam 720.

When article moving beam 700 is moved in the direction of arrow A (FIGS. 2, 14 and 15), due to the operation of transport drive assembly 100 and the coaction of scotch yoke assembly 126, with beam 700, cam surfaces 830 of all of the cams 820 that are pivotally carried by beam 700 will coact with side walls 832, 834 of groove 836 of static beam 720 effecting a rotation of cams 820 in the counter-clockwise direction about pin 822 (FIGS. 14 and 15) as article moving beam 700 moves in the direction of arrow A. Ledges 812 of cams 820 will move into notches 810 of fingers 780 pivoting fingers 780 in the clockwise direction about their respective pivot pins 782 moving fingers 780 from their deactivated positions (FIG. 15) to their activated positions (FIG. 14) with their respective article contacting members 794 raised up through openings 790 and above the level of upper wall 792 of article moving beam 700.

Further movement of article moving beam 700 in the direction of arrow A (FIG. 14) brings a face end or surface 840 of each member 794 into contact with respective inner surface 844 of its associated container 60 to move all containers disposed on materials support and transport assembly 80 in the direction of arrow A from input end 82 thereof towards output end 84 thereof. Such movement of containers 60 is facilitated by the disposition of glide strips 844 of plastic or similar low coefficient of friction materials on top of channel members 750-756 if desired. Any weights 802 disposed in pockets 800 of fingers 780 will facilitate disposition of fingers 780 in their respective activated dispositions (FIG. 14).

The coaction of cams 820 with static beam 720 will also raise article moving beam 700 a slight distance in the direction of arrow "X" (FIG. 15); but not enough so that upper wall 792 of article transport beam 700 contacts the bottom edges of containers 60. As such the forces applied to article transport beam 700 to move containers 60 in the direction of arrow A need only be sufficient to move containers 60 in the direction of arrow A and do not have to raise containers 60 or carry the full weight thereof in order to effect movement of containers 60 in the direction of arrow A. In that respect it is also important to remember the above described modified cycle of operation of scotch yoke assembly 126 (FIGS. 10-10e) to provide a slower but stronger application of forces when effecting movement of article transport beam 700 in the direction of arrow A.

The extent of movement of article transport beam 700 in the direction of arrow A, and the corresponding movement of containers 60 in the direction of arrow A is related to the extent of corresponding movement of scotch yoke assembly 126. All of such movements are, in turn, selected to accommodate the size of containers 60.

During the return stroke, in the cycle of movement of scotch yoke assembly 126 and of article transport beam 700 [i.e. the movement of article transport beam 700 in the direction of arrow B (FIGS. 2, 14 and 15)], cam surface 830 of cams 820 again coact with surfaces 832, 834 of groove 836 in static beam 720 to rock cams 820 in the clockwise direction (FIGS. 14 and 15) about their respective pins 822. The position of pivot pins 782 of fingers 780 and the weighting of member 794 thereof in relation to any weight 802 thereof permits a counter-clockwise rocking of fingers 780 about their respective pivot pins 782 as ledges 812 of cams 820 move out of and away from notches 810 of fingers 780. Thus, during the continued movement of article transport beam 780 in the direction of arrow B fingers 780 will move from their activated positions (FIG. 14) to their deactivated positions (FIG. 15) with members 794 thereof moving through openings 790 and below top wall 792 of beam 700 to pass under container 60 and thus leave container 60 in its advanced position.

Transport drive assembly 100 may thus be cycled and recycled to incrementally move containers 60 along the upper surface of materials support and transport assembly 80. This action may be utilized to move empty containers 60 along support assembly 80 until all such containers 60 pass output end 84 thereof or to move full containers 60 from input end 82 of assembly 80 up to output end 84 thereof or to so move empty containers 60 and full containers 60 along assembly 80 until all empty containers 60 have been replaced by full containers 60. Empty containers 60 may be received as they exit output end 84 of assembly 80 by suitable take-away equipment such as a cross-conveyor, fork-lift, stacker crane guided vehicle, elevator, or even people with or without hand trucks; while full containers may be supplied in similar manner and by similar equipment to input end 82 of assembly 80. As such the supply of full containers 60 to the system and the removal of empty containers 60 from the system takes place at locations outside the working area of the system; i.e. the area through which materials from containers 60 must pass while being fed to the machines and equipment that receive and work on and with the materials being supplied to the system from containers 60. In addition the movement of containers 60 through the work area of the system is accomplished automatically and at a pace that does little if anything to endanger personnel working within that work area of the system.

Thus, for example, when containers 60 are to supply sliver ropes 66 to machines 52 to spin the sliver ropes into yarn or thread; containers 60 full with sliver ropes 66 are supplied to materials support and transport assembly 80 at input end 82 thereof and are moved along glide strips 842 thereof by article transport assemblies 92a, 92b until arrays 60a, 60b of containers 60 are sufficiently full to provide the desired number of feeds of sliver ropes 66 to machine 52. In similar manner full containers 60 are disposed in arrays 60c and 60d. As sliver ropes 66 are about to be exhausted from containers 60a and 60b ropes 66 from aligned containers 60c and 60d are connected, in conventional manner to respective ropes from containers 60a or 60b. When all feeds to spinning machine 52 have been shifted from containers 60a and 60b to containers 60c and 60d article transport assemblies 92a, 92b are activated to feed used containers 60a and 60b out from output end 84 of assembly 80 and to supply new full containers 60a and 60b into input end 82 of assembly 80 until full containers 60a and 60b have replaced all empty containers 60a and 60b. As sliver ropes 66 begin to exhaust from containers 60c and 60d the supply of sliver ropes 66 is again shifted but this time back to containers 60a and 60b. Empty containers 60c and 60d are replaced by full containers in a continuous manner with empty containers being moved out of the system and full containers moved into the system by the automated operation of article transport assemblies 92.

From the above description it will thus be seen that there has been provided: a new and novel method of supplying materials, such as sliver, to a continuous manufacturing process, such as spinning of yarn or thread; a new and novel article transport mechanism for moving containers of materials through to and from an area where work is to be accomplished utilizing such materials; a new and novel mechanism to accomplish a relatively quick connection between and disconnection from the article transport mechanism and its supply of power; as well as a new and novel indexing feed and harmonic drive particularly therefore.

It is understood that although there has been shown preferred embodiments of the invention that various modifications may be made in the details thereof without departing from the spirit as comprehended by the following claims.

What is claimed is:

1. A reciprocatory drive; comprising:
   (a) motor means;
   (b) drive sprocket means connected to said motor means and rotatively driven thereby;
   (c) drag link means carried by said drive sprocket means; and
   (d) scotch yoke means disposed for coaction with said drag link means to be driven in a reciprocatory manner by said drag link means.

2. A reciprocatory drive; comprising:
   (a) motor means;
   (b) drive sprocket means connected to said motor means and rotatively driven thereby;
   (c) drag link means carried by said drive sprocket means; and
   (d) scotch yoke means disposed for coaction with said drag link means to be driven in a reciprocatory manner by said drag link means;
   (e) said drag link means coacting with said scotch yoke means to first drive said scotch yoke means relatively slowly and so as to apply a relatively larger force thereto and thereafter to drive said scotch yoke means relatively faster.

3. The reciprocatory drive of claim 2, including connecting means for connecting said scotch yoke means to a means to be moved to transmit said reciprocatory movement of said scotch yoke means to said means to be moved.

4. The reciprocatory drive of claim 3, wherein said connecting means coacts with scotch yoke means and said means to be moved to effectively impart twice the amount of movement to said means to be moved that is imparted to said scotch yoke means.

5. The reciprocatory drive of claim 4 wherein said connecting means includes a plurality of link chains each having a first end fixedly disposed with respect to said scotch yoke means and a second end connected to a coupling means connected to said means to be moved, and a sprocket means for each such link chain carried by said scotch yoke means and about which a respective link chain is disposed.

6. The reciprocatory drive of claim 5, wherein said coupling means is readily connectable with and disconnectable from said means to be moved.

7. The reciprocatory drive of claim 6, wherein said means to be moved includes a substantially "U" shaped channel member having a pair of spaced legs connected by a wall member; each of said legs being received by and secured to said coupling means.

8. The reciprocatory drive of claim 7, wherein said coupling means includes:
   (a) a spacer block about which said "U" shaped channel member is received;
   (b) a pair of clamp blocks one of which is disposed to each side of said spacer block; and (c) securing means connecting said clamp blocks to said spacer block and to secure said legs of said "U" shaped channel member therebetween.

9. The reciprocatory drive of claim 8, wherein said securing means comprises a plurality of threaded members and a plurality of pin members carried by each of said clamp blocks such that when said plurality of threaded members are threadably secured to said spacer block in a first disposition thereof said plurality of pin members extend through holes formed respectively in said legs of said "U" shaped member and in a second disposition thereof said plurality of pin members are withdrawn from said holes but said threaded members remain threadably connected to said spacer block.

10. The reciprocatory drive of claim 9, wherein chain attaching means are carried by said coupling means for connecting to respective ends of said link chains.

11. A reciprocatory drive; comprising:
   (a) a motor;
   (b) a drive sprocket connected to said motor and rotatively driven thereby;
   (c) a drag link carried by said drive sprocket; and
   (d) a scotch yoke disposed for coaction with said drag link to be driven in a reciprocatory manner by said drag link;
   (e) said drag link coacting with said scotch yoke to first drive said scotch yoke relatively slowly and so a to apply a relatively larger force thereto and thereafter to drive said scotch yoke relatively faster.

12. The reciprocatory drive of claim 11, including a connection means for connecting said scotch yoke to a member to be moved to transmit said reciprocatory movement of said scotch yoke to said member to be moved.

13. The reciprocatory drive of claim 12, wherein said connection coacts with scotch yoke and said member to be moved to effectively impart twice the amount of movement to said member to be moved that is imparted to said scotch yoke.

14. The reciprocatory drive of claim 13, wherein said connection includes a plurality of link chains each having a first end fixedly disposed with respect to said scotch yoke and a second end connected to a coupling connected to said member to be moved, and a sprocket for each such link chain carried by said scotch yoke and about which a respective link chain is disposed.

15. The reciprocatory drive of claim 14, wherein said coupling is readily connectable with and disconnectable from said member to be moved.

16. The reciprocatory drive of claim 15, wherein said member to be moved includes a substantially "U" shaped channel member having a pair of spaced legs connected by a wall member; each of said legs being received by and secured to said coupling.

17. The reciprocatory drive of claim 16, wherein said coupling includes:
   (a) a spacer block about which said "U" shaped channel member is received;
   (b) a pair of clamp blocks one of which is disposed to each side of said spacer block; and
   (c) a securing device connecting said clamp blocks to said spacer block and to secure said legs of said "U" shaped channel member therebetween.

18. The reciprocatory drive of claim 17, wherein said securing drive comprises a plurality of threaded members and a plurality of pin members carried by each of said clamp blocks such that when said plurality of threaded members are threadably secured to said spacer block in a first disposition thereof said plurality of pin members extend through holes formed respectively in said legs of said "U" shaped member and in a second disposition thereof said plurality of pin members are withdrawn from said holes but said threaded members remain threadably connected to said spacer block.

19. The reciprocatory drive of claim 18, wherein chain attachments are carried by said coupling for connecting to respective ends of said link chains.

20. A reciprocatory drive; comprising:
   (a) a motor;
   (b) a drive sprocket; connected to said motor and rotatively driven thereby;
   (c) a drag link carried by said drive sprocket; and
   (d) a scotch yoke disposed for coaction with said drag link to be driven in a reciprocatory manner by said drag link.

* * * * *